No. 66,318.                                                      PATENTED JULY 2, 1867.
J. J. FRENCH.
GLOBE VALVE FOR STEAM ENGINES.
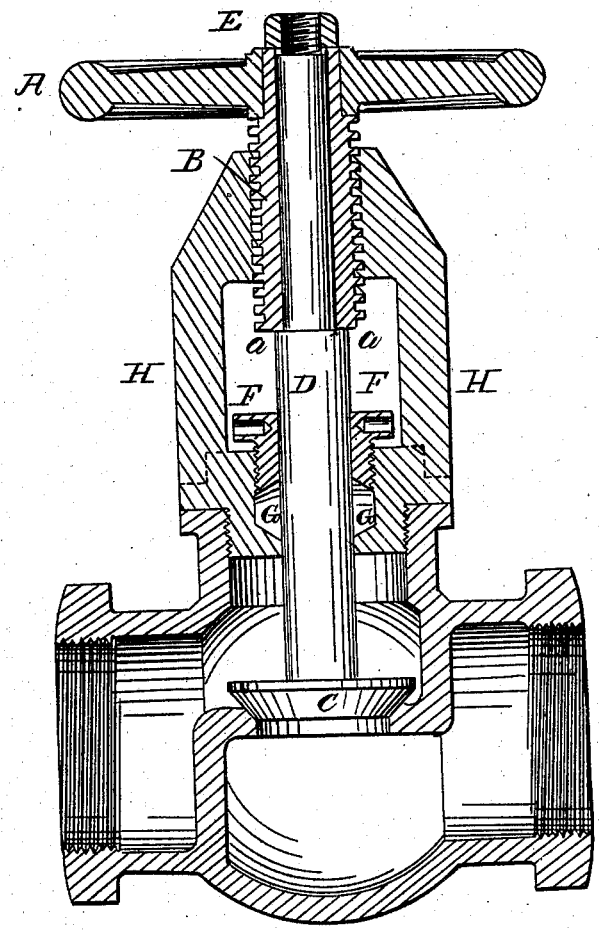

United States Patent Office.

JOSEPH J. FRENCH, OF BALTIMORE, MARYLAND, ASSIGNOR TO HIMSELF AND REUBEN A. McCAULEY.

Letters Patent No. 66,318, dated July 2, 1867.

IMPROVEMENT IN GLOBE-VALVES FOR STEAM ENGINES.

*The Schedule referred to in these Letters Patent and making part of the same.*

TO ALL WHOM IT MAY CONCERN:

Be it known that I, JOSEPH J. FRENCH, of the city of Baltimore, in the county of Baltimore, and State of Maryland, have invented a certain new and useful Improvement in Globe-Valves; and I do hereby declare that the following is a full, clear, and exact description of the same, reference being had to the accompanying drawings, in which the figure represents a vertical section of a valve constructed in accordance with my invention.

The nature of my invention consists in so constructing a globe-valve that the bearings of the stem, being at some distance apart, shall keep the stem and disk in a position that will insure at all times a close-fitting joint between the valve and its seat. In the ordinary valves the stem, having a support only at the screw, is necessarily thrown out of line by the weight of the metal overhanging the bearing when placed in a horizontal position, and when used a short time must injure the seat and render it leaky and useless by wearing away the side opposite to the superincumbent weight. Another advantage of my invention is, that by locating the screw some distance from the valve-seat, and being at all times exposed, it can be lubricated and kept in order, which cannot be done in ordinary valves on account of the cap or bonnet concealing the same, and thus rendering it liable to become chafed or heated.

The facility with which my valve can be repaired forms an important feature of this invention, and may be done as follows: The valve and stem being in their correct positions, take out the arch, and put the grinding material on the valve or disk, then replace the arch, and, by means of a brace or otherwise, rotate the stem, tightening the wheel to give it pressure. When ground sufficiently, take out the arch, clean the parts of sand or other grinding material, replace it, and a tight and perfect joint will be the result. The screw in my valve may be cast on the wheel or core of the wheel, if a wooden one be used, and the valve-stem which passes through it, being smooth and straight, can work in the stuffing-box without dragging out the packing.

To enable others to make and use my invention, I will now proceed to describe the same by reference to the accompanying drawings.

A is the wheel or lever, to which is cast, or otherwise secured, the hollow screw B. Through this hollow screw runs the stem or shaft D, provided with a disk or valve, C, which fits in the seat in the globe, the said stem being cut away at its upper part, forming a shoulder, a, which abuts against the lower end of screw B, and by means of the nut E working on the screw-thread at the upper end of the stem the shoulder is held loosely against the bottom of the screw, so as to rotate or not with it when the wheel A is operated. F is a screw-plug, which holds the packing G in place in the arch H.

It will be seen that the stem, having its bearings in the hollow screw, and also in the lower part of the arch, is always kept in a direct position, thus insuring a tight and perfect joint between the valve and its seat. The wheel A can be secured to the shaft by a nut, E, or by a pin, or in any suitable way. The shoulder, or shaft, or stem D, which abuts against the lower end of screw B, is not absolutely necessary, as it may be replaced by equivalent means, such as a slot and pin.

Having thus described my invention, what I claim as new, and desire to secure by Letters Patent of the United States, is—

A globe-valve, having a wheel or lever, A, carrying a hollow screw, B, to operate the valve C by means of the stem D, constructed and operating in the manner substantially as shown and described and for the purpose set forth.

JOSEPH J. FRENCH.

Witnesses:
W. H. HAYWARD,
L. R. WOOLLEN.